Oct. 29, 1946.　　　　F. V. WERNER　　　　2,410,138
BATCH SCALE
Filed Aug. 17, 1945　　　　3 Sheets-Sheet 1

Inventor
Francis V. Werner,

By Clarence A. O'Brien
and Harvey B. Jacobson
Attorneys

Oct. 29, 1946.　　　　　F. V. WERNER　　　　　2,410,138
BATCH SCALE
Filed Aug. 17, 1945　　　　3 Sheets-Sheet 2

Inventor
Francis V. Werner,
By Clarence A. O'Brien
and Harvey B. Jacobson
Attorneys

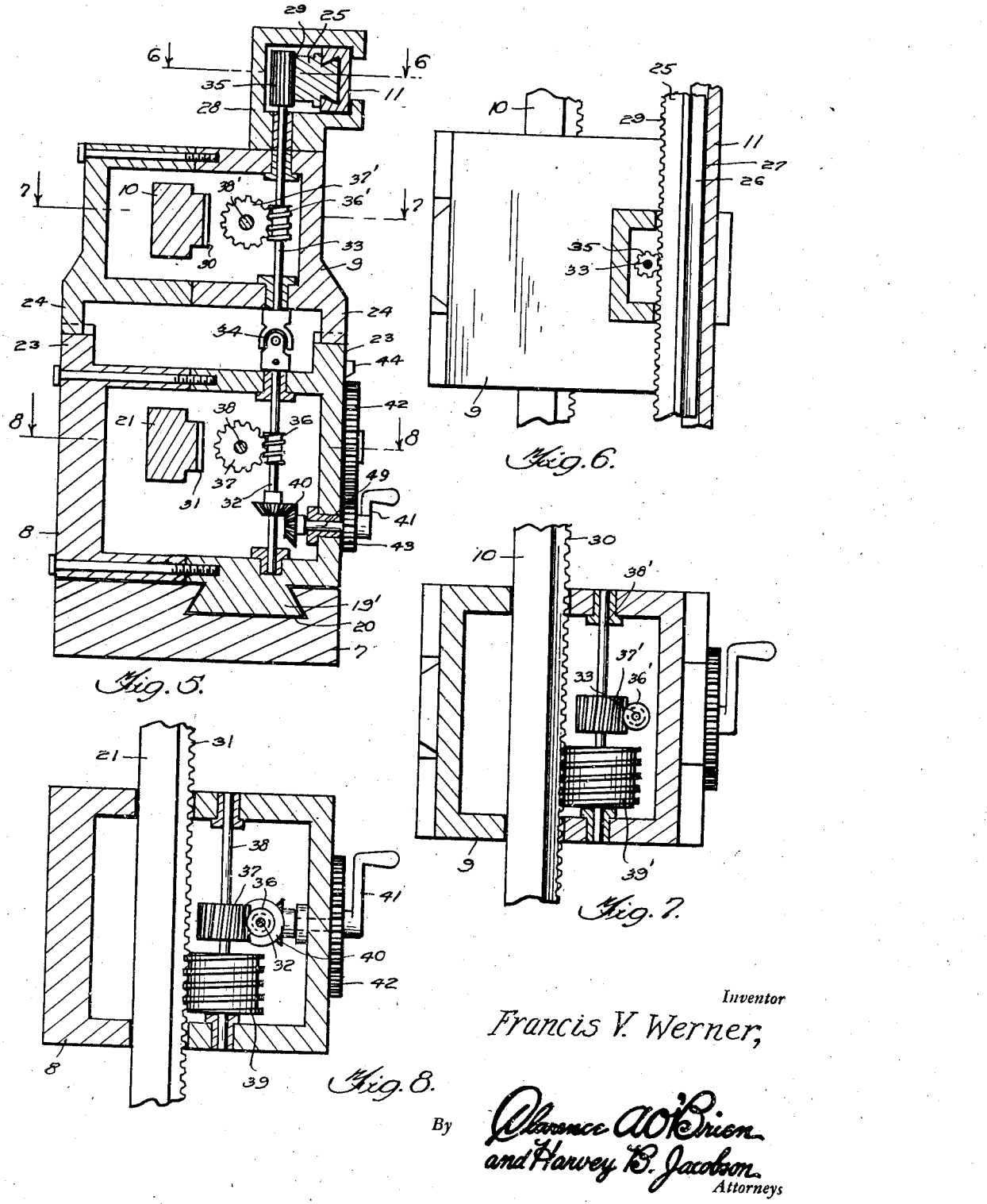

Patented Oct. 29, 1946

2,410,138

UNITED STATES PATENT OFFICE 2,410,138

BATCH SCALE

Francis V. Werner, Bridgeton, N. J.

Application August 17, 1945, Serial No. 611,007

5 Claims. (Cl. 265—53)

This invention relates generally to weighing scales, and has particular reference to the provision of a weighing scale which is so constructed as to facilitate weighing, in proper proportions, the ingredients of a formula or recipe, when the match to be produced is of a different size than that which would be produced by using the amounts of the ingredients given in the formula or recipe, or when the ingredients are to be used in the same proportions as but in different amounts than those given in the formula or recipe.

In carrying out the primary object of the invention, I provide means for readily and accurately adjusting the beam fulcrum of the scale relative to the beam or beams of the latter and for simultaneously automatically adding a predetermined amount of weight to the shortened end of the beam or beams so as to keep them in balance as the fulcrum is adjusted and thereby permit the desired proportional weighing operation to be performed. Due to the adjustment of the fulcrum, the weight imposed on one end of the beam or beams and representing an amount given in the formula or recipe may be balanced by an amount of the ingredient whose weight is imposed on the other end of the beam or beams and is a given percentage greater or lesser than the amount of the ingredient named in the formula or recipe.

Other objects of the invention is to provide a scale of the above kind which is comparatively simple in construction, efficient in operation, and easy to use.

The exact nature of the present invention will become apparent from the following description when considered in connection with the accompanying drawings, in which:

Figure 5 is an enlarged fragmentary vertical section taken on line 5—5 of Figure 1.

Figure 6 is a fragmentary horizontal section taken on line 6—6 of Figure 5.

Figure 7 is a view similar to Figure 6 taken on line 7—7 of Figure 5, and

Figure 8 is a view similar to Figure 6 taken on line 8—8 of Figure 5.

Figure 1:
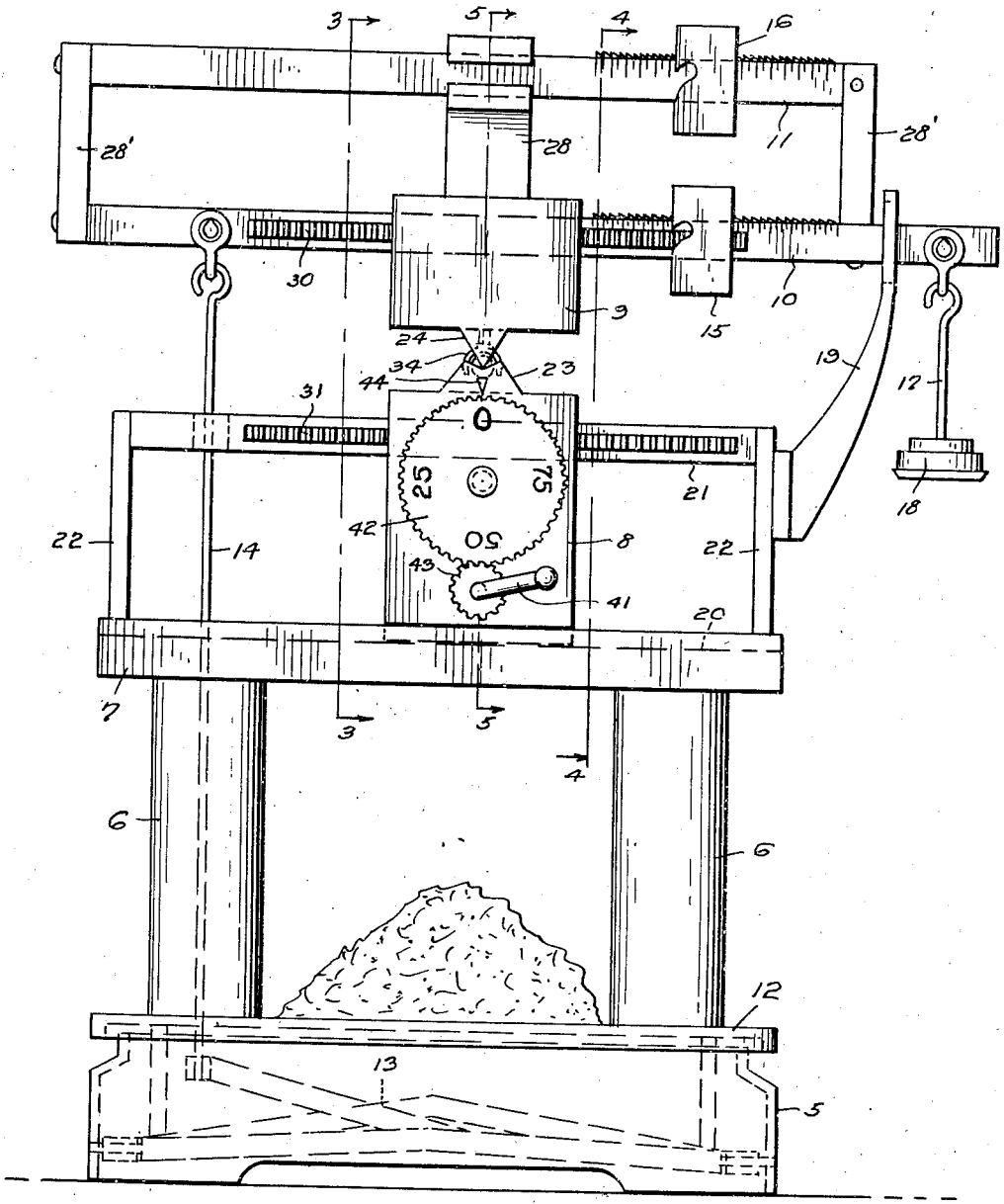
Figure 1 is a front elevational view of a platform scale constructed in accordance with the present invention.

Referring in detail to the drawings, the present invention is shown, merely by way of example, as embodied in the construction of a scale of the platform type including a base 5 having uprights 6 rising from the back thereof, a base plate 7 fixed on the upper ends of said uprights, a lower fulcrum member 8 mounted on the base plate 7, an upper fulcrum member 9 mounted on the lower fulcrum member 8 and carrying spaced beams 10 and 11, and a vertically movable platform 12 supported above the base 5 by the usual system of levers within the base and indicated by dotted lines at 13, and the usual rod 14 operatively connecting the system of levers at 13 with the beams 10 and 11 at one side of the fulcrum members 8 and 9. As shown, the beams 10 and 11 are provided at the side of the fulcrum members opposite that at which the rod 14 is located, with the usual slidable permanent weights 15 and 16, and the usual hanger 17 for removable weights 18. The beam 10 is guided for vertical tilting movement in a definite path by the usual guide bracket 19.

Figure 2:
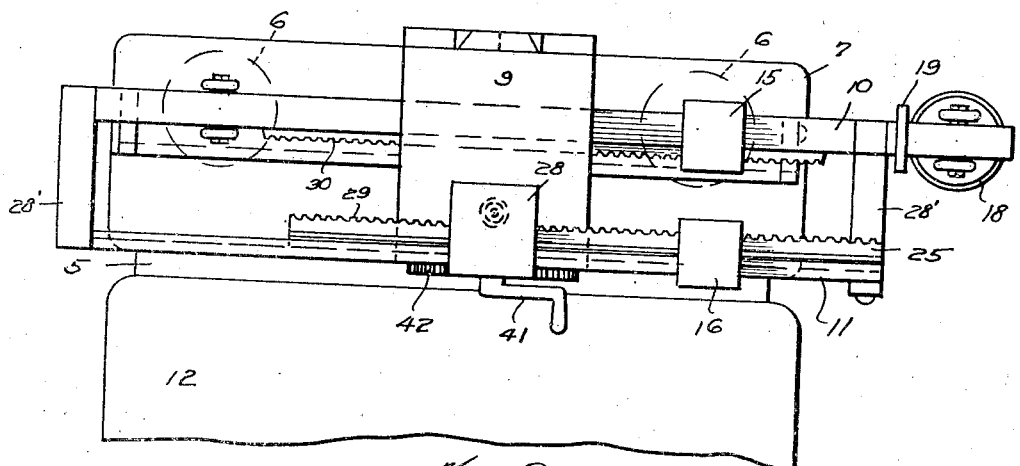
Figure 2 is a fragmentary top plan view thereof.
Figures 3, 4:
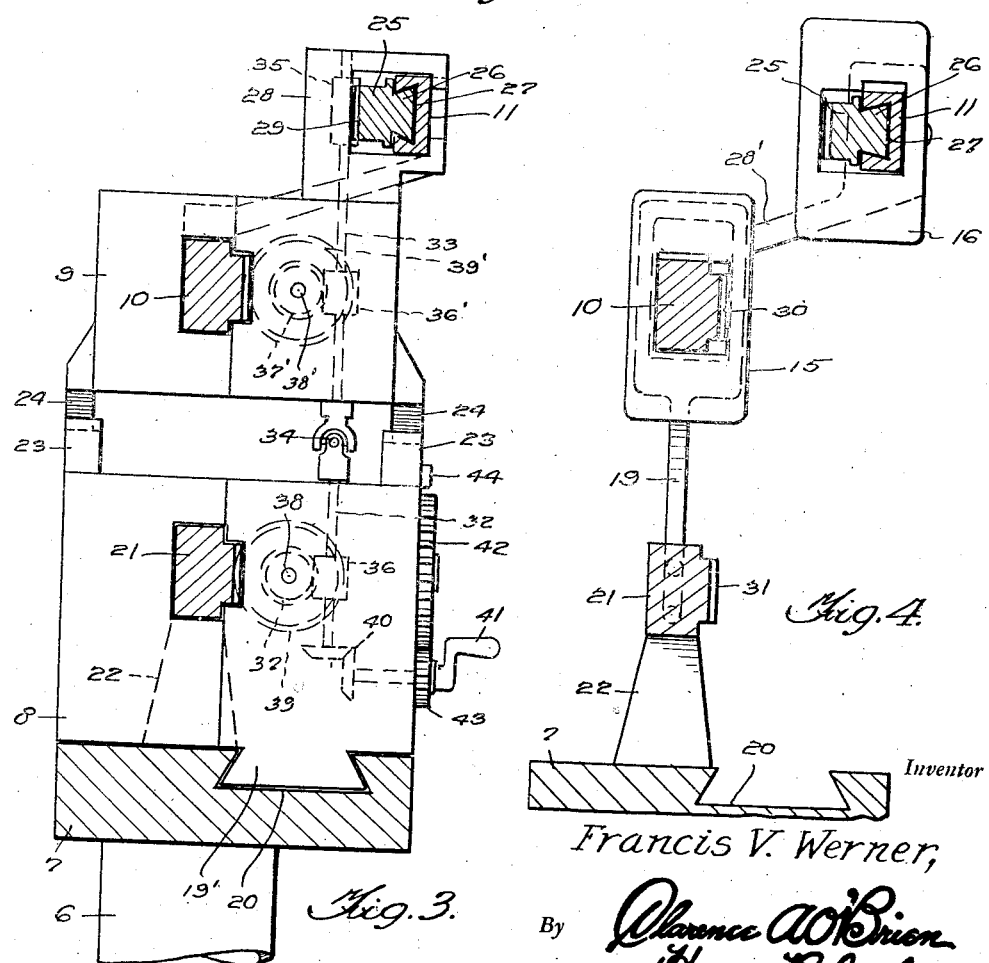
Figure 3 is a fragmentary vertical section taken on line 3—3 of Figure 1.
Figure 4 is a fragmentary vertical section taken on line 4—4 of Figure 1.

In accordance with the present invention, the fulcrum member 8 is slidably mounted on the base plate 7 for horizontal adjustment parallel with the beams 10 and 11, said fulcrum member 8 being provided at the bottom with a dovetailed rib 19' slidably engaging in a dove-tailed groove 20 provided in the upper surface of base plate 7. Rigidly supported in spaced relation to and above the base plate 7 parallel with the beams 10 and 11 is a guide rod 21 supported by end brackets 22 and freely extending through the upper portion of the fulcrum member 8 to assist in guiding the latter when horizontally adjusted. The beam 10 extends through the upper fulcrum member 9 so that the latter is slidably mounted on said beam 10 for adjustment longitudinally of the latter. Coacting fulcrum elements 23 and 24 are respectively provided on the top of the member 8 and the bottom of the member 9 for permitting tilting of the beams 10 and 11 and fulcrum member 9 relative to fulcrum member 8. Slidably mounted on the back of the beam 11 is a bar weight 25 that is adjustable longitudinally of said beam 11. The bar weight 25 preferably has a dove-tailed rib 26 slidably engaged in a dove-tailed groove 27 provided longitudinally of and in the back of the beam 11 as shown more clearly in Figure 2. The beam 11 and bar weight 25 extend freely through an upward extension 28 of the upper fulcrum member 9, so that the extension 28 is movable with the fulcrum member 9 longitudinally of the beam 11. Beams 10 and 11 are rigidly connected together at their ends by connecting plates 28'.

It will be noted that the guide rod 21, beam 10 and weight bar 25 are in the form of racks, the teeth being provided on the back of the bar 25 at 29 and on the fronts of the beam 10 and guide rod 21 as at 30 and 31 respectively. The fulcrum member 8 is hollow and has a vertical shaft 32 journaled therein, while the fulcrum member 9 is also hollow and has a vertical shaft 33 journaled therein in vertical alignment with the shaft 32. Shaft 32 projects through the top of fulcrum member 8 and shaft 33 projects through the bottom of fulcrum 9, the adjacent ends of the shafts 32 and 33 being coupled by a universal joint 34 coincident with the coacting surfaces of the fulcrum elements 23 and 24 so as to not interfere with the rocking of fulcrum member 9 relative to fulcrum member 8. Shaft 33 also extends through the top of fulcrum member 9 into the upper portion of extension 28 where it is equipped with a pinion 35 that meshes with the teeth of bar weight 25. Secured on shaft 32 is a worm 36 meshing with a worm gear 37 secured on a transverse horizontal shaft 38 journaled in fulcrum member 8 between shaft 32 and guide rod 21. A feed screw or worm 39 is also secured on shaft 38 and meshes with the teeth 31 of guide rod 21. In a like manner, a worm 36' is secured on shaft 33 and meshes with a worm gear 37' secured on a transverse horizontal shaft 38' journaled in the fulcrum member 9 between the shaft 33 and the beam 10, a worm or feed screw 39' being secured on shaft 38' and meshing with the teeth 30 of beam 10. The arrangement is such that when shaft 32 is rotated it drives shaft 33 so as to turn worms 39 and 39' through the gearings described, thereby simultaneously adjusting the fulcrum members 8 and 9 at the same speed and for the same distance longitudinally of beam 10 and guide rod 21. At the same time, pinion 35 is rotated so as to shift bar weight 25 relative to beam 11 in the same direction as the fulcrum members 8 and 9 are shifted but at a predetermined greater speed and greater distance. In this way, the unbalancing of the beams 10 and 11 caused by shifting the fulcrum members 8 and 9 is counteracted by the simultaneous adjustment of bar weight 25, thereby maintaining the beams balanced as long as there is no weight on either the platform 12 or the hanger 17 and the weights 15 and 16 are adjusted to zero. For driving shaft 32, a shaft 49 is journaled in and extends through the front wall of the fulcrum member 8 and operatively connected at its rear end with the shaft 32 by a beveled gearing 40, the shaft 49 being equipped on its projecting forward end with an operating crank or handle 41. A graduated indicator disc or dial 42 is journaled on the front of fulcrum member 8 and has peripheral teeth which mesh with a pinion 43 secured on the projecting end of shaft 49. The fulcrum member 8 has an index marker or point 44 coacting with the graduations of dial 42. The arrangement is such that when the shaft 49 is rotated in one direction until the zero graduation of dial 42 is coincident with the index element 44, the beams 10 and 11 will be balanced if no weight is placed on the hanger 17 and the platform 12 and the weights 15 and 16 are adjusted to zero. If the shaft 49 is then further rotated in the same direction under similar conditions, the fulcrum members 8 and 9 and the bar weight 25 will be shifted to the left of Figure 1, and the balance of the beams 10 and 11 will be maintained by the adjustment of the bar weight 25. However, this shortens the distance between the fulcrum members and the rod 14 and lengthens the distance between said fulcrum members and the ends of the beams 10 and 11 which receive the weights. It is evident, therefore, that a greater weight is required on the platform 12 than that imposed on the right hand ends of the beams 10 and 11 to maintain a balance of the beams. The percentage that the weight on the platform exceeds that placed or imposed on the right hand ends of the beams 10 and 11, is indicated by the graduation of dial 42 which coincides with the index element 44. On the other hand, with the zero graduation of dial 42 coinciding with index element 44, rotation of shaft 49 in the opposite direction will cause shifting of the fulcrum members 8 and 9 and the bar weight 25 to the right of Figure 1, lessening the distance between the fulcrum members and the weighted ends of the beams and increasing the distance between the fulcrum members and the rod 14 while maintaining the balance of the beams due to the adjustment of the bar weight 25. When this is done, a given weight imposed on the right hand ends of the beams 10 and 11 will be balanced by a lesser weight placed on the platform 12, the percentage which the weight on the platform is exceeded by the weights imposed on the beams being indicated by the graduation of dial 42 registered with the indicating index element 44.

From the foregoing description, it is believed that the construction and operation, as well as the advantages of the present invention, will be readily understood and appreciated by those skilled in the art. By means of the present scale, the ingredients of a formula or recipe may be readily weighed in proper proportions when the ingredients are to be used in the same proportions as but in different amounts than those given in the formula or recipe. It is simply necessary to ascertain the percentage in which the ingredients are to be increased or decreased relative to the amounts given in the formula in order to produce the batch desired, and to then adjust the fulcrum members 8 and 9 and the bar weight 25 in the proper direction and to the extent indicated by rotation of the dial 42. While the invention is disclosed in connection with the construction of a scale of the platform type, it will be obvious that it is applicable to other types of scales. Also, minor changes may be made in details of construction illustrated and described, such as fall within the scope of the invention, as claimed.

What I claim is:

1. In a batch scale, a balance-beam, an element to receive the material to be weighed connected to one end of the balance beam, means to facilitate imposition of predetermined weights on the other end of said balance-beam, a base member, a lower fulcrum member on said base member, an upper fulcrum member carrying said balance-beam and tiltable on the lower fulcrum member, said fulcrum members being adjustable relative to the base and the balance-beam longitudinally of the latter, a weight adjustable longitudinally of the balance-beam, and manually operable means to simultaneously adjust the fulcrum members and the weight in the same direction and in either direction for any desired predetermined distance relative to the base and the balance-beam, said means causing a differential movement between the weight and the fulcrum members to keep the balance-beam balanced as the fulcrum members are adjusted.

2. In a batch scale, a pair of spaced rigidly connected balance-beams, an element to receive the material to be weighed connected to one end of the balance-beams, means to facilitate imposition of predetermined weights on the other end of said balance-beams, a base member, a lower fulcrum member on said base member, an upper fulcrum member carrying said balance-beams and tiltable on the lower fulcrum member, said fulcrum members being adjustable relative to the base and the balance-beams longitudinally of the latter, a weight adjustable longitudinally of one of the balance-beams, a guide rod for the lower fulcrum member, the other balance-beam and the weight and the guide rod being in the form of racks, aligned vertical shafts journaled in the fulcrum members, a universal joint between said shafts coincident with the plane of the point at which the upper fulcrum member tilts on the lower fulcrum member, worms engaging said other balance-beam and said guide rod and operatively connected to the respective shafts so that driving of the latter will cause simultaneous adjustment of the fulcrum members in the same direction relative to the base and the balance beams, a driving connection between the shaft of the upper fulcrum member and said weight for shifting the latter in the same direction as the fulcrum members are shifted but at a greater speed to keep the balance-beams balanced as the fulcrum members are adjusted, and manually operable means for driving the shaft of the lower fulcrum member for adjusting the fulcrum members any desired predetermined distance relative to the base and the balance-beams.

3. The construction defined in claim 2 wherein the base is provided with a dove-tailed groove, said lower fulcrum member having a bottom dove-tailed rib slidably engaged in said groove.

4. The construction defined in claim 2, wherein the one beam is provided with a longitudinal dove-tailed groove in the rear thereof, said weight being in the form of a bar having a dove-tailed rib slidably engaged in said groove of the one balance-beam.

5. The construction defined in claim 1, wherein said manually operable means includes a manually rotatable dial and a coacting index element on the lower fulcrum member for indicating the degree of adjustment of the fulcrum members.

FRANCIS V. WERNER.